US012739448B2

(12) United States Patent
Goto et al.

(10) Patent No.: US 12,739,448 B2
(45) Date of Patent: Sep. 15, 2026

(54) REMOTE SUPPORT SYSTEM

(71) Applicant: TOYOTA JIDOSHA KABUSHIKI KAISHA, Toyota (JP)

(72) Inventors: Takefumi Goto, Gotemba (JP); Hiromitsu Urano, Numazu (JP); Ryo Shirono, Sunto-gun (JP); Takashi Komaru, Kawasaki (JP); Shinya Ohkawa, Matsuyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/045,744

(22) Filed: Feb. 5, 2025

(65) Prior Publication Data

US 2025/0317606 A1 Oct. 9, 2025

(30) Foreign Application Priority Data

Apr. 3, 2024 (JP) ................................ 2024-060139

(51) Int. Cl.

| | |
|---|---|
| ***H04N 21/2187*** | (2011.01) |
| ***G05D 1/224*** | (2024.01) |
| ***G05D 109/10*** | (2024.01) |
| ***G05D 111/10*** | (2024.01) |
| ***H04N 21/2387*** | (2011.01) |

(52) U.S. Cl.
CPC ....... *H04N 21/2187* (2013.01); *G05D 1/2247* (2024.01); *H04N 21/2387* (2013.01); *G05D 2109/10* (2024.01); *G05D 2111/10* (2024.01)

(58) Field of Classification Search
CPC ........... H04N 21/2187; H04N 21/2387; G05D 1/2247; G05D 2109/10; G05D 2111/10
See application file for complete search history.

(56) References Cited

U.S. PATENT DOCUMENTS

| | | | | |
|---|---|---|---|---|
| 6,515,597 | B1 | 2/2003 | Wada et al. | |
| 2020/0057487 | A1* | 2/2020 | Sicconi | G06F 3/011 |
| 2021/0094567 | A1* | 4/2021 | Imai | B60W 60/001 |

FOREIGN PATENT DOCUMENTS

| | | |
|---|---|---|
| JP | H02-164198 A | 6/1990 |
| JP | 2001-218197 A | 8/2001 |
| JP | 2021-057724 A | 4/2021 |

* cited by examiner

*Primary Examiner* — Sumaiya A Chowdhury
(74) *Attorney, Agent, or Firm* — Oliff PLC

(57) ABSTRACT

A remote support system includes one or more processors configured to display a video acquired from a camera mounted on a vehicle or an infrastructure camera on a display device of a remote operator terminal. When a past video needs to be displayed on the display device, the remote support system shortens a first past video recorded from a past first timing to a current time to a second period shorter than a first period from the past first timing to the current time and displays the second period on the display device. After the display of the first past video corresponding to the second period is finished, the remote support system switches the display of the display device to a real-time video.

5 Claims, 6 Drawing Sheets

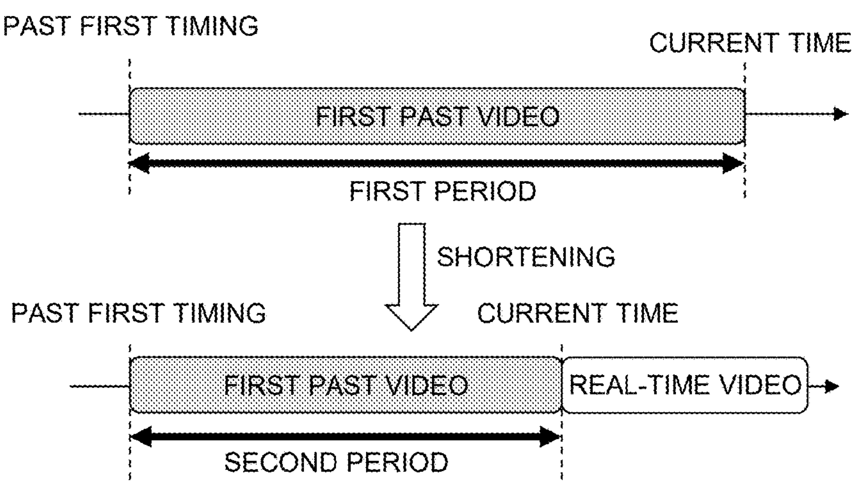
FIG. 4A
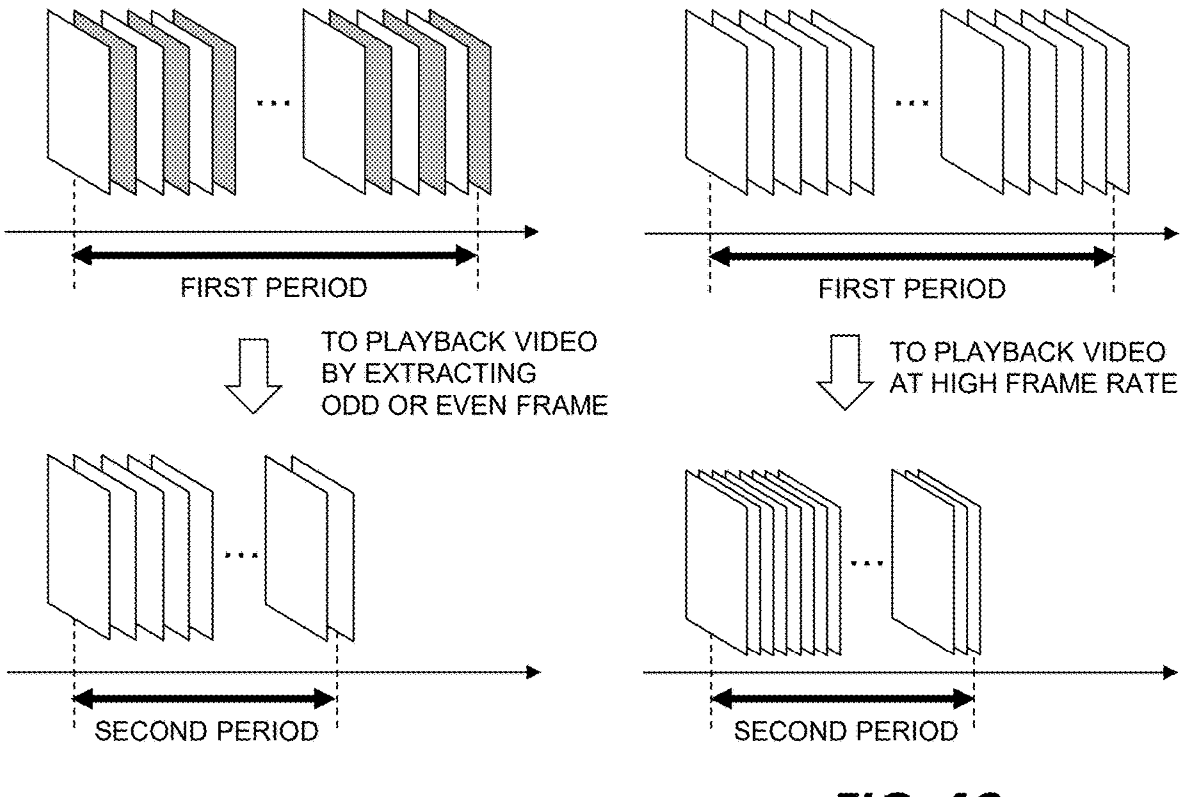
FIG. 4B
FIG. 4C

REMOTE SUPPORT SYSTEM

CROSS-REFERENCE TO RELATED APPLICATION

The present application claims priority under 35 U.S.C. § 119 to Japanese Patent Application No. 2024-060139, filed on Apr. 3, 2024, the contents of which application are incorporated herein by reference in their entirety.

BACKGROUND

Technical Field

The present disclosure relates to a technique for remote supporting a vehicle.

Background Art

JP 2001218197 A discloses a device that captures an image of the surroundings of a vehicle with a camera mounted on the vehicle and displays the captured image of the surroundings of the vehicle on a screen of a monitor display unit. In addition, as documents showing the technical level of the present technical field, there are the following JP H02164198 A and JP 2021057724 A.

SUMMARY

Considered is a technology for remote supporting a vehicle. Until the operator is assigned to the vehicle that is the remote support target, the operator cannot check the surrounding situation of the vehicle. Further, the surrounding situation of the vehicle changes from moment to moment. When the remote support for the vehicle is performed based on the surrounding situation of the vehicle after the operator is assigned, there is a concern that appropriate remote support for the vehicle cannot be performed.

An object of the present disclosure is to provide a technique for enabling an operator to continuously check a surrounding situation of a vehicle from the past in remote support of the vehicle.

A first aspect of the present disclosure relates to a remote support system for remote support of a vehicle.

The remote support system includes one or more processors configured to display a video acquired from a camera mounted on a vehicle or an infrastructure camera on a display device of a remote operator terminal.

One or more processors configured to:

when a past video needs to be displayed on the display device, shorten a first past video recorded from a past first timing to a current time to a second period shorter than a first period from the past first timing to the current time and display the second period on the display device; and switch the display of the display device is switched to the real-time video after the display of the first past video corresponding to the second period is finished.

According to the present disclosure, when the past video needs to be displayed on the display device, the first past video recorded from the past first timing to the current time is displayed on the display device in the second period shorter than the first period from the past first timing to the current time. After the display of the first past video corresponding to the second period is finished, the display of the display device is switched to the real-time video. Thus, the operator can continuously check the surrounding situation of the vehicle from the past, and appropriate remote support to the vehicle can be performed.

BRIEF DESCRIPTION OF DRAWINGS

FIG. 4A is an explanatory diagram showing a specific example of fast-forward playback of past video;

FIG. 4B is an explanatory diagram showing a specific example of fast-forward playback of past video;

FIG. 4C is an explanatory diagram showing a specific example of fast-forward playback of past video;

DESCRIPTION OF EMBODIMENT

Figure 1:
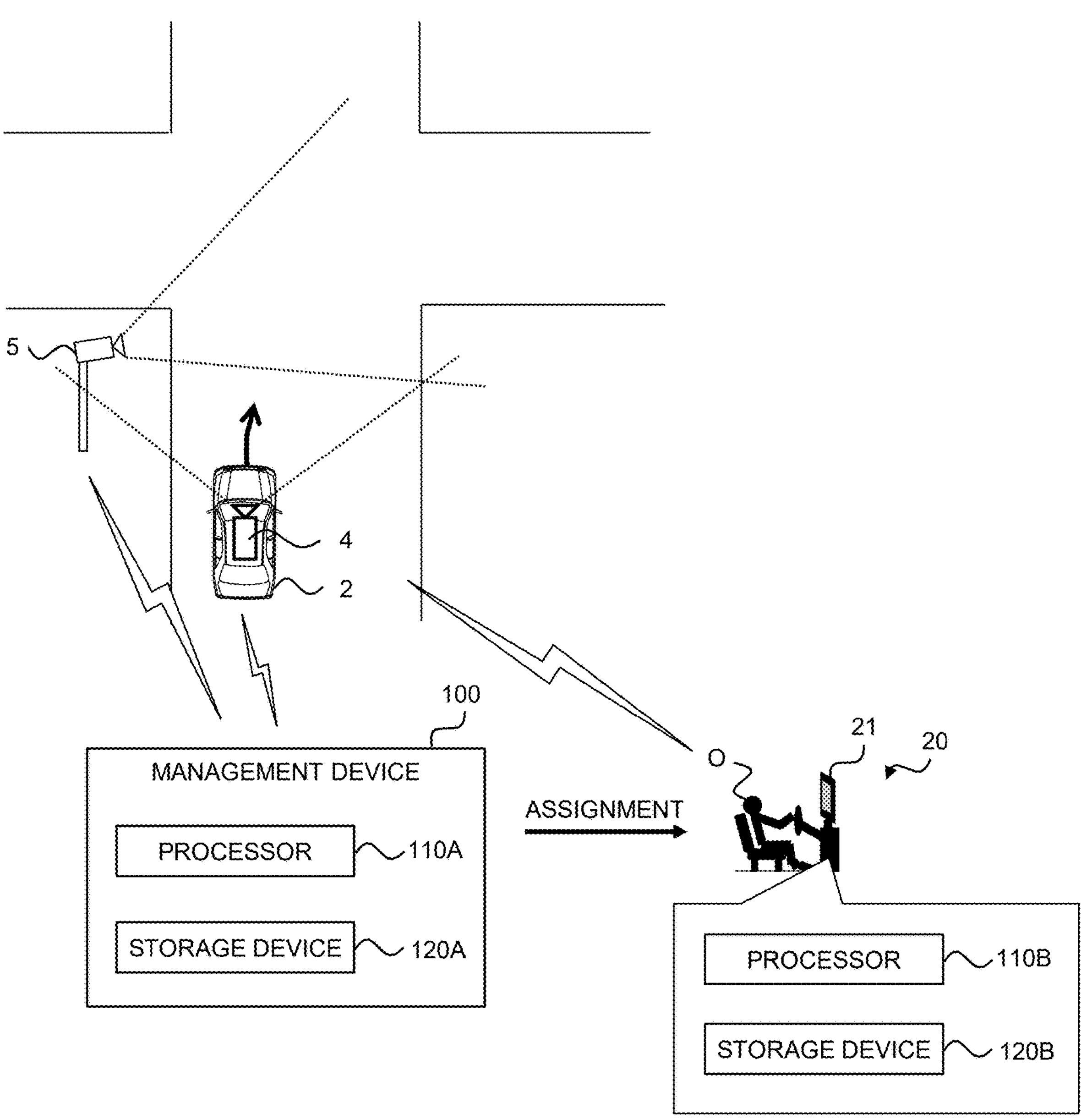
FIG. 1 is a diagram for explaining an overview of a remote support system according to an embodiment.

A remote support system according to an embodiment of the present disclosure will be described with reference to the accompanying drawings. In addition, the same reference numerals are given to the same elements in the drawings, and the overlapping description will be omitted.

1. Overview of Remote Support System

FIG. 1 is a diagram for explaining an overview of a remote support system 1 according to an embodiment. The remote support system 1 is a system for remote supporting a vehicle 2. When receiving a request for remote support from the vehicle 2, the remote support system 1 performs remote support of the vehicle 2.

The remote support system 1 includes, for example, a vehicle 2, a remote operator terminal 20, and a management device 100. The vehicle 2, the remote operator terminal 20, and the management device 100 can communicate with each other via a communication network. For example, the vehicle 2 can wirelessly communicate with the remote operator terminal 20 or the management device 100 via a wireless communication network. The remote operator terminal 20 and the management device 100 can communicate with each other via a wired/wireless communication network.

The vehicle 2 is a target of remote support. The vehicle 2 that is a target of remote support assistance may be an automatically driven vehicle or a manually driven vehicle. The automatic driving means that steering, acceleration, and deceleration of the vehicle 2 are automatically performed independently of the operation of the driver. When the vehicle 2 is an autonomous driving vehicle, the vehicle 2 may have an autonomous driving function for autonomous driving. When it is determined that the automatic driving of the vehicle 2 is difficult, the automatic driving function requests the management device 100 to provide remote support. For example, the autonomous driving function transmits a remote support request to the management device 100.

The remote operator terminal 20 is a terminal device used when the remote operator O remote supports the vehicle 2. That is, the remote operator terminal 20 is configured to be used by the remote operator O for remote support of the vehicle 2. Examples of the remote operator terminal 20 include a cockpit type terminal, a PC, a tablet, and a smartphone.

The management device 100 is a computer that manages the remote support system 1. The management device 100 may be configured by a plurality of servers that perform distributed processing. The management device 100 manages the vehicle 2. The management device 100 may manage a plurality of remote operators O and a plurality of remote operator terminals 20. For example, the management device 100 allocates the remote operator O and the remote operator terminal 20 to the remote support of the vehicle 2 in response to the remote support request.

The vehicle 2 is equipped with a camera 4. The camera 4 captures an image of the situation around the vehicle 2 and acquires an image (video) indicating the situation around the vehicle 2. The vehicle 2 communicates with the remote operator terminal 20 and transmits the video to the remote operator terminal 20. The vehicles 2 may transmit the video to the remote operator terminals 20 via the management device 100.

In a case where the infrastructure camera 5 is installed at a place where the remote support of the vehicle 2 is performed or in the vicinity thereof, the remote operator O may perform the remote support of the vehicle 2 using an image (video) acquired from the infrastructure camera 5. In this case, the infrastructure camera 5 acquires a video image indicating a place where the remote support of the vehicle 2 is performed or a situation around the place. The infrastructure camera 5 communicates with the remote operator terminal 20 and transmits a video to the remote operator terminal 20. The infrastructure camera 5 may transmit the video to the remote operator terminal 20 via the management device 100. The infrastructure camera 5 is configured to be able to communicate with the remote operator terminal 20 and the management device 100.

The remote operator terminal 20 receives the video transmitted from the vehicle 2 or the video transmitted from the infrastructure camera 5. The remote operator terminal 20 presents the video acquired from the camera 4 or the infrastructure camera 5 to the remote operator O. Specifically, the remote operator terminal 20 includes a display device 21, and displays a video acquired from the camera 4 or the infrastructure camera 5 on the display device 21.

The remote operator O recognizes the surrounding situation of the vehicle 2 by viewing the video displayed on the display device 21, and performs remote support of the vehicle 2. Thus, the remote support of the vehicle 2 is realized.

Here, the video displayed on the display device 21 will be considered. The video displayed on the display device 21 may be a real-time video corresponding to the current time or a past video indicating a video in the past from the current time. The past video is a video recorded from a past timing to the current time. The past video is obtained by recording a video acquired by the camera 4 or the infrastructure camera 5. The past video may be acquired by the management device 100, may be acquired by the remote operator terminal 20, or may be acquired by both the management device 100 and the remote operator terminal 20. That is, the past video displayed on the display device 21 includes at least one of the past video recorded by the management device 100 and the past video recorded by the remote operator terminal 20. For example, among the past videos displayed on the display device 21, the past video before the remote operator O is assigned to the remote support of the vehicle 2 may be acquired by the management device 100, and the past video after the remote operator O is assigned to the remote support of the vehicle 2 may be acquired by the remote operator terminal 20.

The past video displayed on the display device 21 is reproduced in a time shorter than the entire recording time, for example. The reproduction in a time shorter than the entire recording time is called fast-forward playback. The remote operator terminal 20 is configured to fast-forward play the past video displayed on the display device 21. In the fast-forward playback of the past video, the past video may be partially played back normally, or the past video may be partially played back slowly. Details of the fast-forward playback of the past video will be described later.

A criterion for determining whether or not the past video needs to be displayed on the display device 21 will be considered. For example, the remote support system 1 may determine that the past video needs to be displayed on the display device 21 when a remote support request is received from the vehicle 2. As another example, the remote support system 1 may determine that the display of the past video on the display device 21 is necessary when there is a request from the remote operator O who performs remote support of the vehicle 2. As another example, the remote support system 1 may determine that the past video needs to be displayed on the display device 21 in accordance with a scene when the remote support request is received from the vehicle 2. The scene that needs to be displayed on the display device 21 of the past video may be determined by, for example, AI. The determination of whether or not the display of the past video on the display device 21 is necessary may be performed by the management device 100, the vehicle 2, or the remote operator terminal 20. A specific example of a scene that requires the past video to be displayed on the display device 21 will be described later.

The remote support system 1 includes one or more processors 110 (hereinafter, simply referred to as a processor 110) and one or more storage devices 120 (hereinafter, simply referred to as a storage device 120). The processor 110 may include a processor 110A in the management device 100 and a processor 110B in the remote operator terminals 20. The storage device 120 may include a storage device 120A in the management device 100 and a storage device 120B in the remote operator terminals 20.

The processor 110 executes various processes. As the processor 110, a central processing unit (CPU) is exemplified. The storage device 120 stores various kinds of information (for example, a video acquired by the camera 4, a video acquired by the infrastructure camera 5, and a past video) necessary for processing by the processor 110. Examples of the storage device 120 include a volatile memory, a nonvolatile memory, a hard disk drive (HDD), and a solid state drive (SSD). The functions of the management device 120 and the remote operator terminals 20 may be implemented by cooperation between the processor 110 that executes the remote support program and the storage device 100. The remote support program is stored in the storage device 120. Alternatively, the remote support program may be recorded in a computer-readable recording medium. The remote support program may be provided via a network.

The processor 110 (remote support system 1) executes a process of displaying a past video for remote support. The outline of the display processing of the past video is as follows. When the display device 21 needs to display the past video, the processor 110 shortens the first past video recorded from the past first timing to the current time to a second period shorter than a first period from the past first timing to the current time and displays the first past video on the display device 21. Then, after the display of the first past video corresponding to the second period is finished, the processor 110 switches the display of the display device 21 to the real-time video. Thus, the remote operator O can continuously check the surrounding situation of the vehicle 2 from the past, and appropriate remote support for the vehicle can be performed.

2. Example of Scene Requiring Display of Past Video

Figure 2:
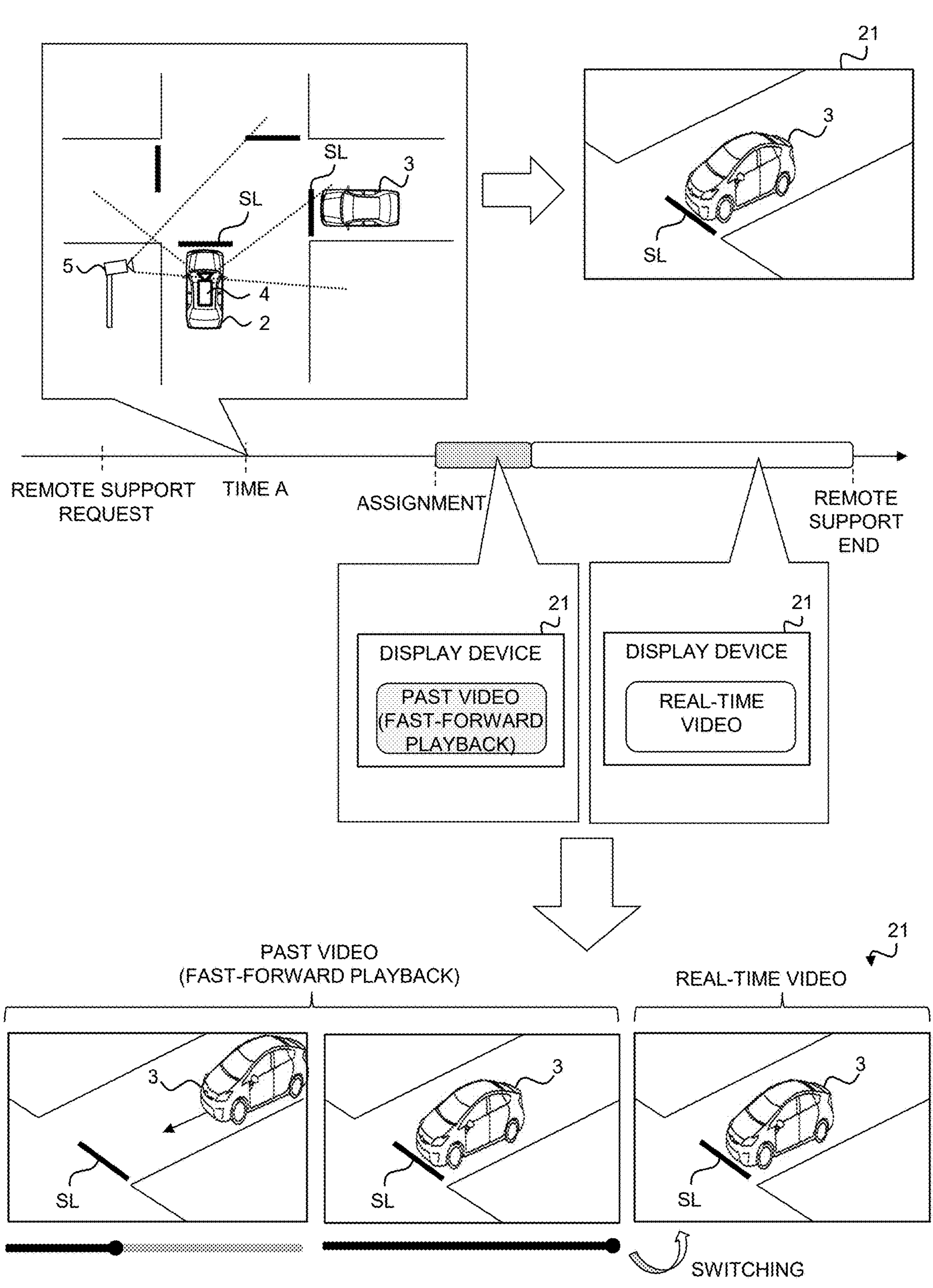
FIG. 2 is an explanatory diagram showing an example of a scene in which a past video needs to be displayed.

FIG. 2 is an explanatory diagram showing an example of a scene in which a past video needs to be displayed. For example, as shown at time A in FIG. 2, a scene is considered in which a remote support request such as a start timing is issued from the vehicles 2 that are temporarily stopped at a stop line 4way at an intersection (for example, 4way stop) at which there is no traffic light. The "4way stop" means an intersection at which all vehicles in four directions are required to stop temporarily, and which is defined to stop temporarily at a stop line SL of the intersection and then start in the order of arrival at the intersection. At the timing when the remote operator O is assigned, the other vehicle 3 is assumed to stop at the stop line SL of the intersecting lane intersecting with the own lane. If only the video after the remote operator O is assigned is displayed on the display device 21, the remote operator O cannot recognize which of the vehicle 2 and the other vehicle 3 has stopped at the stop line SL of the intersection earlier.

Therefore, the remote support system 1 (the remote operator terminal 20) displays the past video on the display device 21 after the remote operator O is assigned to the vehicle 2 in the scene. Thus, the remote operator O can recognize which of the vehicle 2 and the other vehicle 3 has stopped at the stop line SL of the intersection earlier. Furthermore, the remote operator terminal 20 fast-forward-reproduces the past video displayed on the display device 21, and switches the past video to the real-time video at the timing when the display of the past video is finished. Thus, the remote support of the vehicle 2 can be smoothly performed. Note that a playback position (e.g., a seek bar) may be displayed in the past video so that the remote operator O can check the remaining time of the playback time of the past video.

3. Example of Fast Forward Playback of Past Video

3-1. Overview

Figure 3:
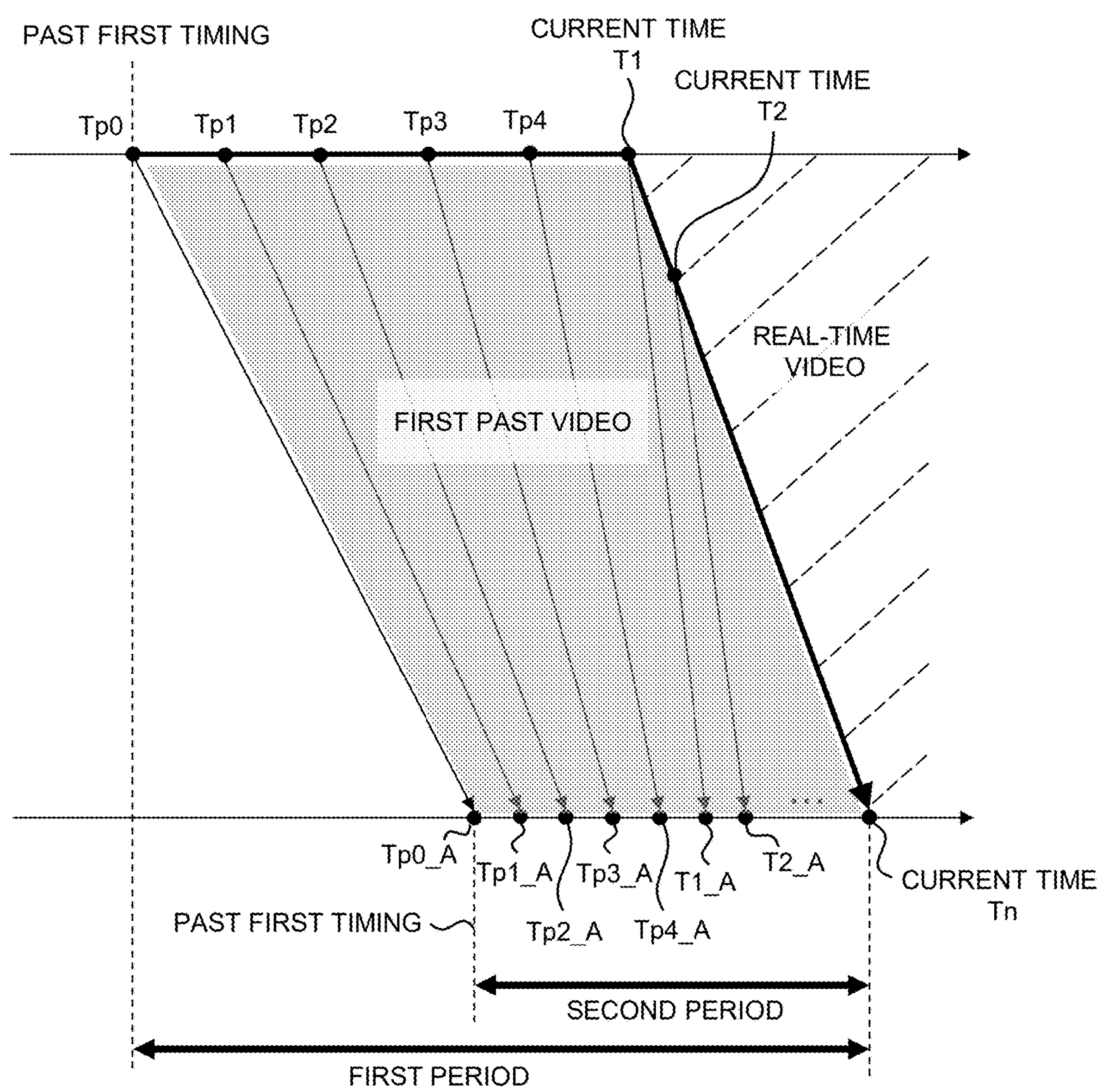
FIG. 3 is a diagram for explaining an outline of fast-forward playback of past video.

FIG. 3 is a diagram for explaining an outline of fast-forward playback of past video. The fast-forward playback of the past video is to shorten the display period of the past video. The display period of the past video indicates a period of the past video recorded from a past timing (also referred to as a past first timing) to the current time. The period from the past first timing to the current time is also referred to as a first period, and the video recorded from the past first timing to the current time is also referred to as a first past video. For example, the past first timing may be a time at which the remote support request is received from the vehicle 2, a time determined according to a scene in which the past video needs to be displayed on the display device 21, or a time designated by the remote operator O who performs the remote support of the vehicle 2.

Here, the current time used to represent the display period of the first past video is considered. The current time when the first past video is displayed on the display device 21 changes every moment. That is, the display period of the first past video becomes longer as time elapses. When the display period of the first past video is long, the start of the remote support for the vehicle 2 is delayed. In order to shorten the display period of the first past video, the remote support system 1 shortens the first past video corresponding to the period (first period) from the past first timing to the current time to a second period shorter than the first period from the past first timing to the current time and displays the first past video on the display device 21.

For example, as shown in FIG. 3, a case is considered where the current time when it is determined that the past video needs to be displayed on the display device 21 is set as time T1, the time of the past first timing is set as time Tp0, and the time when the first past video catches up with the current time, that is, the time when the first past video is switched to the real-time video is set as time Tn. In this case, the first period is a period from the time Tp0 to the time Tn. On the other hand, the second period shorter than the first period is a period from the time Tp0_A to the time Tn as shown in FIG. 3.

Here, it is assumed that the sampling times of the first past video corresponding to the first period are Tp0, Tp1, Tp2, Tp3, Tp4, T1, T2, . . . , and Tn, and the sampling times of the second period corresponding to the first past video at the sampling times of the first period are Tp0_A, Tp1_A, Tp2_A, Tp3_A, Tp4_A, T1_A, T2_A, . . . , Tn. In this case, the sampling intervals of the second period (the period from Tp0_A to Tp1_A, the period from Tp1_A to Tp2_A, the period from Tp2_A to Tp3_A, the period from Tp3_A to Tp4_A, the period from Tp4_A to T1_A, the period from T1_A to T2_A, . . . ) are shorter than the sampling intervals of the first period (the period from Tp0 to Tp1, the period from Tp1 to Tp2, the period from Tp2 to Tp3, the period from Tp3 to Tp4, the period from Tp4 to T1, the period from T1 to T2, . . . ).

In this way, the first past video corresponding to the first period is shortened to the second period shorter than the first period from the past first timing to the current time and displayed on the display device 21, and thus the fast-forward playback of the first past video is realized.

3-2. Specific Example

FIG. 4 is an explanatory diagram showing a specific example of fast-forward playback of past video. As shown in FIG. 4A, as a method of shortening the first past video corresponding to the first period to the second period shorter than the first period from the past first timing to the current time, for example, there is a method shown in FIG. 4B or FIG. 4C.

In the example shown in FIG. 4B, a method is used in which some of all the frames of the first past video corresponding to the first period are extracted and the frames are connected and reproduced. Examples of the part of the frames include odd frames and even frames.

In the example shown in FIG. 4C, the first past video corresponding to the first period is reproduced at a frame rate higher than the frame rate at the time of imaging or recording. In this case, all the frames of the first past video can be fast-forward-reproduced.

4. Effect

According to the present embodiment, when the display of the past video on the display device 21 is necessary, the first past video recorded from the past first timing to the current time is displayed on the display device 21 in the second period shorter than the first period from the past first timing to the current time. After the display of the first past video corresponding to the second period is finished, the display of the display device 21 is switched to the real-time video. Thus, the remote operator O can continuously check the surrounding situation of the vehicle 2 from the past, and appropriate remote support for the vehicle can be performed.

5. Modifications

Figure 5:
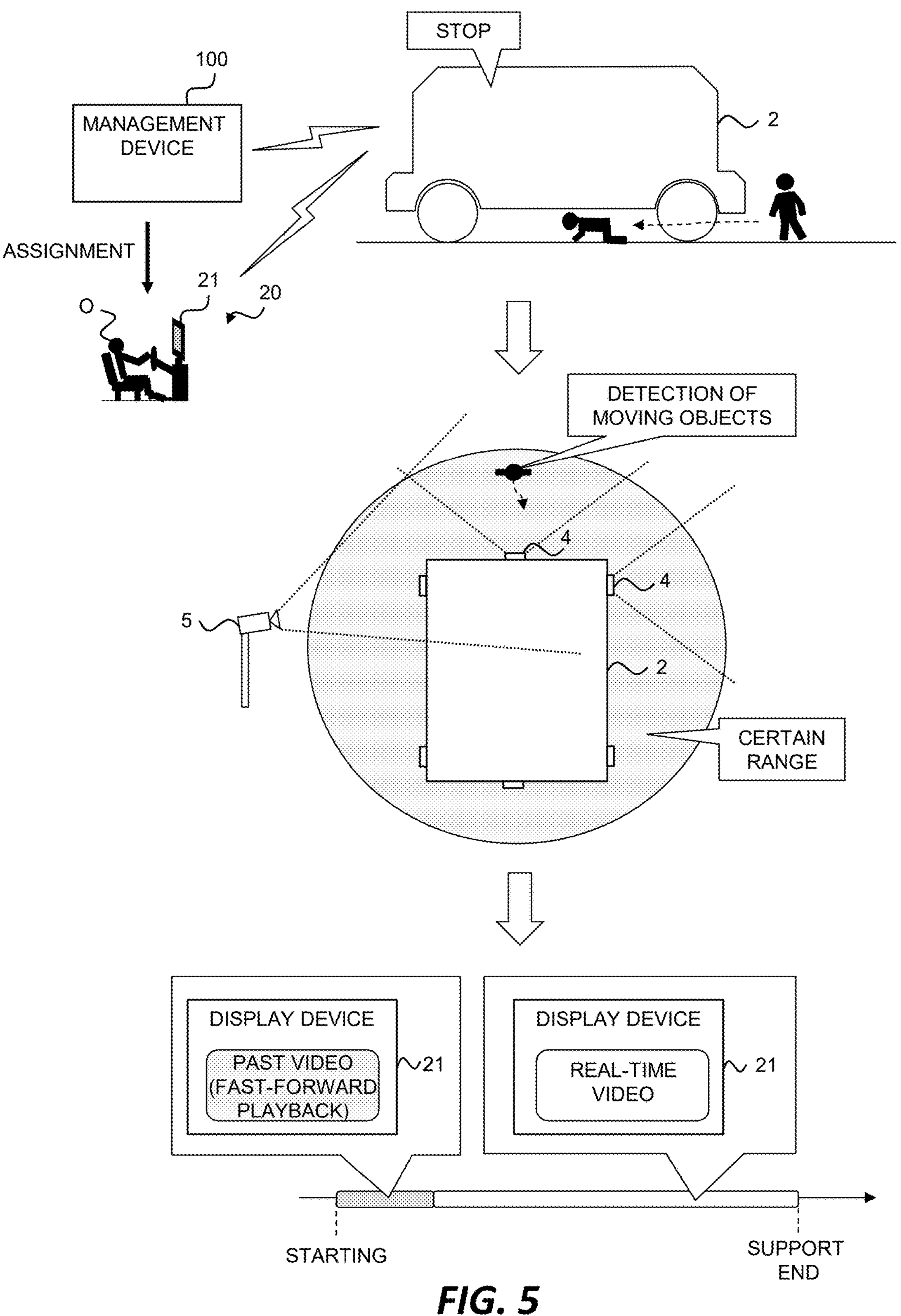
FIG. 5 is an explanatory diagram showing a modification of a scene requiring display of a past video.

FIG. 5 is an explanatory diagram showing a modification of a scene that requires display of a past video. A scene in which the vehicle 2 is a passenger transport vehicle (for example, a bus), a remote support request for a start timing is received from the vehicle 2 that is stopped at a bus stop, and it is unclear whether there is a moving object (for example, a child or an animal) that has gotten under the vehicle 2 while the vehicle 2 is stopped at the bus stop is considered. For example, when there is a moving object that has gotten under the vehicle 2 before the remote operator O is assigned to the vehicle 2, the remote operator O cannot confirm whether or not the moving object has gotten under the stopped vehicle 2 even when the remote operator O views the information displayed on the display device 21. Therefore, the remote support system 1 displays the past video on the display device 21 after the remote operator O is assigned to the vehicle 2 in the scene.

A first past timing which is a start timing of a display period of a past video (first past video) displayed on the display device 21 will be considered. The timing at which the moving object gets under the vehicle 2 is after the vehicle 2 stops at the bus stop. When the moving object gets under the vehicle 2, the moving object approaches the vehicle 2 and crouches. The past first timing is, for example, a timing at which a moving object is first detected within a certain range from the vehicle 2 in a predetermined period before the timing at which the remote support request is received from the vehicle 2. The predetermined period is, for example, a period from when the vehicle 2 stops at the bus stop to when the remote support request is received. However, the predetermined period is not limited to this. For example, the predetermined period may be a period from when the vehicle 2 stops at a bus stop to when the remote operator O is assigned to the vehicle 2. Thus, even when the moving object gets under the vehicle 2 during a period from the reception of the remote support request to the allocation of the remote operator O to the vehicle 2, the display device 21 can display the first past image.

According to the modification of the present embodiment, the remote support system 1 detects a moving object around the vehicle 2 based on the video acquired from the camera 4 or the infrastructure camera 5. As a method of detecting a moving object, for example, an optical flow for detecting the movement of an object is used. When a moving object is detected for the first time within a certain range from the vehicle 2 in a predetermined period before the timing at which the remote support request from the vehicle 2 is received, the remote support system 1 determines that the past video needs to be displayed on the display device 21. The remote support system 1 (remote operator terminal 20) displays the past video on the display device 21 after the remote operator O is assigned to the vehicle 2 and before the vehicle 2 starts. Thus, the remote operator O can check whether or not there is a moving object that has gotten under the stopped vehicle 2 by viewing the past video displayed on the display device 21. Furthermore, the remote operator terminal 20 fast-forward-reproduces the past video displayed on the display device 21, and switches the past video to the real-time video at the timing when the display of the past video is finished. Thus, the remote support of the vehicle 2 can be smoothly performed.

Figure 6:
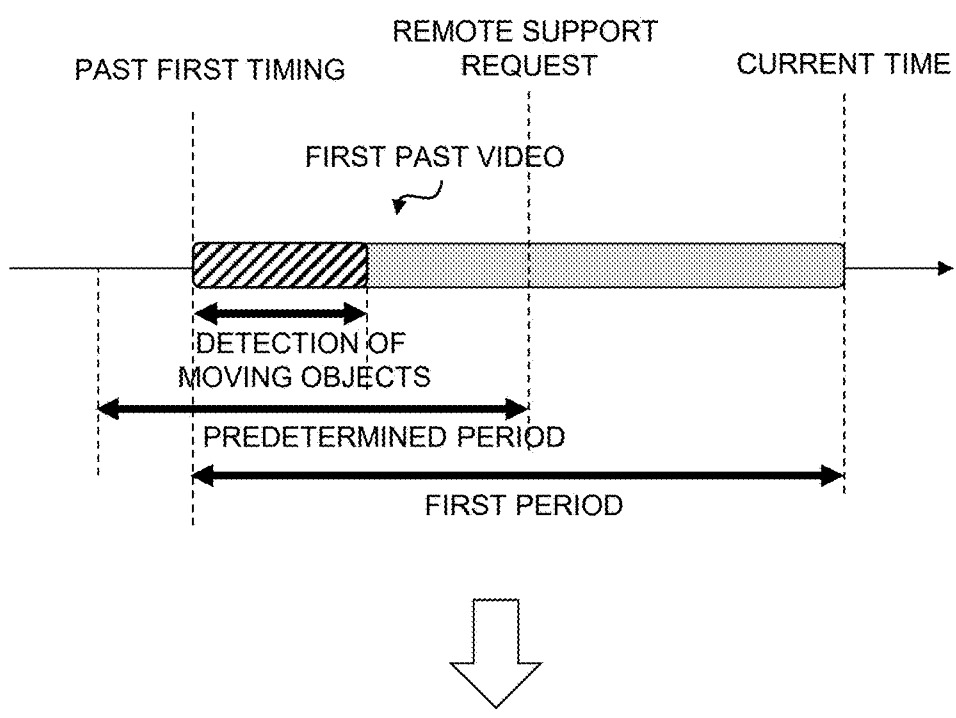
FIG. 6 is an explanatory diagram showing a modification of fast-forward playback of past video.
Figure 6:
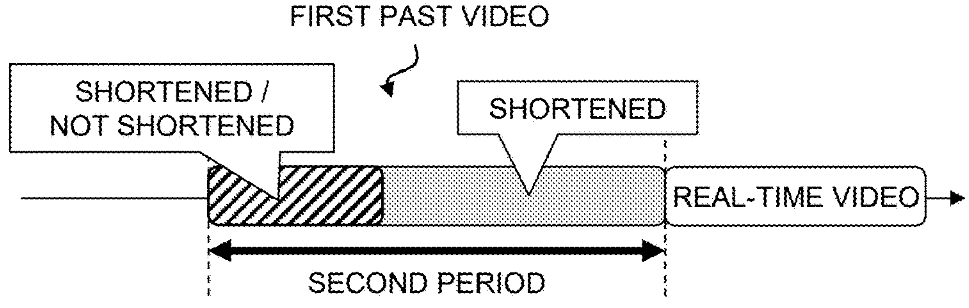

FIG. 6 is an explanatory diagram showing a modification of the fast-forward playback of the past video (first past video). The remote support system 1 may perform normal playback of a part of the first past video in accordance with the detection state of the moving object. For example, the state of the moving object when the moving object is detected includes a state in which the moving object gets under the vehicle 2, a state in which the moving object gets out of the vehicle 2, and the like. Since it is assumed that the period during which the moving object is detected is short, the first past video may be normally reproduced without being fast-forward-reproduced during the detection of the moving object.

Therefore, the remote support system 1 may display a part of the first past video corresponding to the first period on the display device 21 for the same period as the first period, and may display the rest of the first past video corresponding to the first period on the display device 21 after shortening the period to a period shorter than the first period. In this case, the first past video corresponding to a part of the second period is reproduced in the normal reproduction mode, and the first past video corresponding to the remaining part of the second period is reproduced in the fast-forward reproduction mode. Thus, the remote operator O can check whether or not the moving object is getting under the stopped vehicle 2 without overlooking the moving object.

What is claimed is:

1. A remote support system for remote support of a vehicle, the remote support system comprising processing circuitry configured to display a video acquired from a camera mounted on the vehicle or an infrastructure camera on a display device of a remote operator terminal, wherein the processing circuitry is configured to:

when a past video needs to be displayed on the display device, shorten a first past video recorded from a past first timing to a current time to a second period shorter than a first period from the past first timing to the current time and display the first past video corresponding to the second period on the display device; and switch the display of the display device to a real-time video after the display of the first past video corresponding to the second period is finished.

2. The remote support system according to claim 1, wherein the processing circuitry is configured to fast-forward play the first past video.

3. The remote support system according to claim 1, wherein the first timing is a timing at which a remote support request from the vehicle is received.

4. The remote support system according to claim 1, wherein the processing circuitry is configured to detect a moving object around the vehicle based on the video, and the first timing is a timing at which the moving object is first detected within a certain range from the vehicle in a predetermined period before a timing at which a remote support request from the vehicle is received.

5. The remote support system according to claim 1, wherein the first timing is designated by an operator who performs the remote support of the vehicle.

* * * * *